(12) United States Patent
Liang et al.

(10) Patent No.: US 7,164,424 B2
(45) Date of Patent: Jan. 16, 2007

(54) INTERACTIVE WATER EFFECTS USING TEXTURE COORDINATE SHIFTING

(75) Inventors: Lin Liang, Beijing (CN); Yanyun Chen, Beijing (CN); Ying-Qing Xu, Beijing (CN); Baining Guo, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/113,208

(22) Filed: Apr. 22, 2005

(65) Prior Publication Data

US 2005/0195196 A1    Sep. 8, 2005

Related U.S. Application Data

(63) Continuation of application No. 10/017,733, filed on Dec. 13, 2001, now Pat. No. 6,985,148.

(51) Int. Cl.
*G06T 13/00*    (2006.01)

(52) U.S. Cl. .................. 345/473; 345/582; 345/629

(58) Field of Classification Search ............. None
See application file for complete search history.

(56) References Cited

U.S. PATENT DOCUMENTS

| | | | | |
|---|---|---|---|---|
| 4,167,019 A | * | 9/1979 | Shepperd | 348/725 |
| 5,239,623 A | * | 8/1993 | Sato et al. | 345/419 |
| 5,325,480 A | * | 6/1994 | Rice | 345/474 |
| 5,455,902 A | * | 10/1995 | Ellson et al. | 345/473 |
| 5,537,641 A | * | 7/1996 | da Vitoria Lobo et al. | 345/419 |
| 5,877,777 A | * | 3/1999 | Colwell | 345/473 |
| 6,121,977 A | * | 9/2000 | Arai et al. | 345/619 |
| 6,266,071 B1 | * | 7/2001 | Stam et al. | 345/473 |
| 6,448,970 B1 | * | 9/2002 | Kajioka et al. | 345/473 |
| 6,483,520 B1 | * | 11/2002 | Uchi et al. | 345/619 |
| 6,765,589 B1 | * | 7/2004 | Georgiev et al. | 345/646 |
| 6,781,592 B1 | * | 8/2004 | Murayama et al. | 345/585 |
| 2003/0090484 A1 | * | 5/2003 | Comair et al. | 345/420 |

OTHER PUBLICATIONS

Broadman et al., "Inside 3D Studio Max 2, vol. II: Modeling and Materials", New Riders 1998, pp. 328-335, 362-365, 383-384, 405-407, 539-541, and Color Gallery first 2 pages.*
Bryce 5.0 User Guide for Macintosh and Windows, Pub 1999, MetaCreations Corp., pp. 36-40.*

* cited by examiner

*Primary Examiner*—Ulka Chauhan
*Assistant Examiner*—Daniel F. Hajnik
(74) *Attorney, Agent, or Firm*—Lyon & Harr, LLP; Richard T. Lyon

(57) ABSTRACT

A system and process for adding a photorealistic rendering of a body of water to a virtual 3D scene or image and creating a video therefrom having interactive water effects. A region of water is added to an image by adding an area depicting the original scene as it would appear if reflected by still body of water. Then, the appearance of the added water region is distorted over a series of image frames in such a way as to simulate how the reflected scene would look if the surface of the water were in motion. The water can have dynamic waves and the user can interact with the water in numbers of ways, including generating ripples on the water surface and creating rain. In addition, these effects can be achieved at full screen resolution with the use of the latest graphics hardware by employing a texture shifting technique.

19 Claims, 15 Drawing Sheets

| | x,y-1 | |
|---|---|---|
| x-1,y | x,y | x+1,y |
| | x,y+1 | |

FIG. 3

| -A/4 | -A/2 | -A/4 |
|---|---|---|
| -A/2 | -A | -A/2 |
| -A/4 | -A/2 | -A/4 |

FIG. 6

INTERACTIVE WATER EFFECTS USING TEXTURE COORDINATE SHIFTING

CROSS-REFERENCE TO RELATED APPLICATIONS

This application is a continuation of a prior application entitled INTERACTIVE WATER EFFECTS USING TEXTURE COORDINATE SHIFTING which was assigned Ser. No. 10/017,733 and filed Dec. 13, 2001 now U.S. Pat. No. 6,985,148.

BACKGROUND

1. Technical Field

The invention is related to fluid animation, and more particularly to a system and process for adding a body of water to an image and generating a video therefrom having interactive water effects.

2. Background Art

Fluid animation is important for a wide range of applications, especially in the addition of a body of water to an image and simulation of wave or ripple motion across the surface of the water over a sequence of video frames. These animations are employed in images created for video games, special effects and the production of commercial advertising, among others. However, the field of computer graphics research has all but ignored fluid animation, owing at least in part to the difficulty of modeling fluids. Unlike solids, fluids do not have a readily definable shape, and the motion of fluid, such as the movement of a surface of a body of water in the presence of waves and ripples, is often complex. In the past, complicated physical models based on fluid dynamics have been attempted to model the motion of water. However, these methods tend to be computationally expensive and difficult to implement in real time. A relatively simple process for adding a body of water to an image and simulating its motion over a series of video frames, which produces visually realistic results, has eluded animators.

Fluid animation can be handled in many ways, one of which is through so-called surface techniques. The present invention is related to such surface techniques. Typically, these techniques involve modeling periodic waves or ripples on the surface of the water. However, current simulations tend to appear somewhat repetitive and quickly become boring. It is believed this is in large part due to a lack of interactive viewer involvement with the animation. In addition, as alluded to above, these simulation tend to be quite complex and processor intensive, owing in part to having to process each pixel of each frame of the video simulation. The present system and process addresses these issues.

SUMMARY

The present invention is directed toward a system and process for adding a photorealistic rendering of body of water to a virtual 3D scene or image to create a video in which a viewer can interact with the water in real time. In its most general form, the technique takes as input an image and generates the appearance of water dynamics by warping a reflected copy of the image. In other words, a region of water is added to the scene depicted in an image by first adding to the image an area depicting the original scene as it would appear if reflected by still body of water. Then, the appearance of the added water region is distorted over a series of image frames in such a way as to simulate how the reflected scene would look to an observer if the surface of the water were in motion. For example, the region can be distorted to simulate the look of waves or ripples, or both, on the surface of the water. Thus, a wave would appear to propagate, or a ripple would appear to spread out from its source, as the scene is viewed over a sequence of frames of the video. A viewer can also interact with the water in numbers of ways, including generating ripples on the water's surface and creating rain. These effects can be achieved at full screen resolution with the use of the latest graphics hardware.

The process of generating video that includes interactive water effects begins by inputting an image of a scene. A reflection copy of the image is then generated, and the original image and the reflection image are merged and sized as desired, via conventional methods, to create a first water-added image. Specifically, the reflection image is essentially identical to the input image but reversed, like a mirror image of the scene. The merged image simply depicts a scene where the bottom edge of the original image is joined to the bottom edge of the reflection image. Thus, the reflection copy is upside-down. The merged image is also sized to comport with the desired video frame size.

This water-added image is then distorted to depict periodic waves, viewer-generated ripples, or both. In general, these water effects are added to the water region of the merged image using a 2D height map that represents the surface of the water. This height map has a plurality of points each of which is assigned a height value. These map points correspond to image points in the water region of the water-added image, which could for example be pixel locations. In fact, it is convenient to have a height map point correspond to each pixel in the water region of the water-added image.

As for adding periodic waves, they are generally incorporated into a water-added image by using a basic wave module that generates height values for each height map location, and adding these values to the current heights assigned to the corresponding map locations. The height values generated by the periodic wave model simulate the shape and location of a wave on the surface of the water region at a given point in time, and in addition, the module generates a new set of height values at each succeeding time increment that simulate the shape and location of the wave at it propagated across the surface of the water. Any conventional wave generating module can be employed for generating the periodic wave height values. However, in tested embodiments of the present invention, a 1D basic wave module was employed. This module simulates a wave on the surface of the water that travels in one direction and has the same height across each row of pixels in the water region in the direction perpendicular to the direction of propagation.

Thus, for the first water-added image that a periodic wave is to be added, the water region is distorted to simulate how the surface of the water would appear with a wave. The distortion is accomplished by computing new image coordinates for each point in the water region of the image corresponding to a height map point, which typically will be each pixel of the region. The new image coordinates are computed for each image point by first computing a new horizontal coordinate. This is accomplished by adding the current height assigned to the height map for the image point to the right of the point under consideration and the height value generated by the periodic wave module for this same location at the point in time being associated with the water-added frame undergoing the distortion procedure. Similarly, the current height assigned to the height map for the image point to the left of the point under consideration is added to the height value generated by the periodic wave module for that location at the point in time associated with the water-added frame undergoing distortion. The sum computed for the right-side neighbor is then subtracted from the sum computed for the left-side neighbor. The resulting difference may then be divided by a factor that relates the scale of the height map to that of the image. However, if the height map scale is made to match the image scale the factor is equal to one. The value computed by the foregoing procedure represents the change in position that is to be applied to the horizontal coordinate of the image point under consideration. Thus, if the value is positive, the new horizontal coordinate of the point is located to the right of the current position by the amount of the computed change. Conversely, if the change value is negative positive, the new horizontal coordinate of the point is located to the left of the current position by the amount of the computed change.

The new vertical coordinate for each image point is computed in a similar manner. Specifically, the current height assigned to the height map for the image point directly above the location corresponding to the image point under consideration is added to the height value generated by the periodic wave module for this location at the point in time being associated with the water-added frame undergoing the distortion procedure. Additionally, the current height assigned to the height map for the image point immediately below the location corresponding to the image point under consideration is added to the height value generated by the periodic wave module for that location at the point in time associated with the water-added frame undergoing distortion. The sum computed for the overlying neighbor is then subtracted from the sum computed for the underlying neighbor, and the difference is divided by the aforementioned relational factor if necessary. The value computed by the foregoing procedure represents the change in position that is to be applied to the vertical coordinate of the image point under consideration. If the value is positive, the new vertical coordinate of the point is located to the below the current position by the amount of the computed change (assuming the positive vertical direction is downward in the image—e.g., away from the shoreline). Conversely, if the change value is negative positive, the new vertical coordinate of the point is located above the current position by the amount of the computed change.

The foregoing process is simplified somewhat if a 1D periodic wave model is employed, as it was in tested embodiments of the invention. In such a case, the new vertical coordinate location for each image point in the water region is found in the same way as described above. However, the new horizontal coordinate location is simply found by subtracting the current height assigned to the height map for the image point to the right of the location corresponding to the image point under consideration from the current height assigned to the height map for the point to the left of the point under consideration, and then using this change value to determine new horizontal location. This simplification was found to produce a realistic wave effect, while reducing the amount of processing required to generate each frame of the video.

Ripples are added interactively by allowing a viewer to select a point in the water region of a displayed water-added frame. This point becomes the ripple center. Essentially, the ripple is added by imposing a ripple mask onto the height map associated with the next water-added frame to be generated. The mask identifies a series of height values that are used to modify the currently assigned height values of the height map locations of the next frame's height map in a neighborhood centered about the location corresponding to the selected point in the displayed water-added image. Specifically, in tested embodiments, a height value representing the full amplitude of the desired ripple is added to the height map location corresponding to the selected image point. Whereas, a height value equal to one-half the desired ripple amplitude is added to the height map locations corresponding to image points above, below, to the right and to the left of the image point corresponding to the ripple center. In addition, a height value equal to one-quarter the desired ripple amplitude is added to the height map point corresponding to each directly diagonal neighboring location surrounding the image point corresponding to the ripple center. The ripple amplitude can be either a positive or negative value, although a negative value was used in the tested embodiments to simulate an object dropping into the water, thereby creating a localized depression in the water's surface. The current height values in the height map on which a ripple has been imposed are revised accordingly. This is done prior to computing the new image coordinates for each point in the water region, or adding any height values associated with a periodic wave.

It is noted that more than one ripple can be added to the same frame by having multiple ripple centers selected and by applying each of multiple ripple masks in the manner described above. It is further noted that the ripple amplitude need not be the same for each ripple added to a frame.

In the case where a ripple is added to a frame, but no periodic wave is present, the new image coordinates are computed as follows. Essentially, like with the periodic wave, the water region is distorted by computing new image coordinates for each point in the image corresponding to a height map point. The new horizontal coordinate for each image point in the water region is computed by subtracting the current height assigned to the height map for the image point to the left of the image point under consideration from the current height assigned to the height map for the image point to the right of the image point under consideration. The resulting difference may then be divided by a factor that relates the scale of the height map to that of the image, as discussed previously. If the difference is positive, the new horizontal coordinate of the point is located to the right of the current position by the amount of the computed change. Conversely, if the difference is negative, the new horizontal coordinate of the point is located to the left of the current position by the amount of the computed change. The new vertical coordinate for each image point is computed in a similar manner. Specifically, the current height assigned to the height map for the image point directly above the image point under consideration is subtracted from the current height assigned to the height map for the image point immediately below the image point under consideration. The difference is then divided by the aforementioned relational factor. If the resulting difference is positive, the new vertical coordinate of the point is located below the current position by the amount of the computed change (assuming the positive vertical direction is downward in the image). Conversely, if the difference is negative, the new vertical coordinate of the point is located above the current position by the amount of the computed change.

The foregoing procedures for adding periodic waves and ripples to a frame of the video in which it is desired to add such water effects, can be repeated for each succeeding frame generated for the video. In addition, wave and ripple spreading dynamics are added to simulate the motion of these effects over time. Essentially, this is accomplished by computing a new height value for each point in the height map associated with the next frame being generated using the values assigned to the height map of the immediately preceding frame of the video. This is done before imposing any new ripple or adding in the periodic wave heights. Specifically, for each height map point, the height values assigned in the last generated height map for points directly above and below, as well as directly to the left and to the right, of the point under consideration, are added together. This sum is then divided by two, and the height value assigned to the previous height map for the point under consideration is subtracted from the just computed quotient. The resulting difference is the new height value of the height map point under consideration and is assigned to that location.

A damping factor can also be applied to simulate a ripple dying out as it spreads across the surface of the water. This is accomplished by, prior to assigning a new resultant height value to a height map location, first applying a damping factor. Specifically, the new resultant height value is multiplied by the factor, and the product is subtracted from the computed height to produce a damped resultant height. It is this damped resultant height that is assigned to the height map point under consideration in lieu of the previously assigned value.

It is possible to reduce the processing requirements associated with the foregoing processes by manipulating texture space rather than image space, if the frame being generated is rendered using a 3D model of the scene and an associated texture map, as is often the case in computer graphics applications. This savings results because the previously-described processes are used to distort relatively fewer texture map points. In addition, the reduced processing requirements make generating full screen image frames a possibility, even for lower power computing systems.

The initial task in adapting the previously-described processes to manipulating a texture map is to define an orthogonal grid that represents the height map for a region of water being added to an image. The grid is defined by first establishing the coordinates of the four corner vertices of the scene plane. The scene plane would equal the full screen size if a full screen video is desired. The height of the horizontal line representing the dividing line between the added water region and the rest of the image is specified, as are the horizontal and vertical grid resolution values. These can be default values or entered by the viewer. Given the foregoing items, the vertices of the grid can be identified to define the grid. Once the grid has been defined, the original texture map associated with the image being modified to add water effects is reflected, and sized to fit within a region having an overall size matching that of the grid. This reflected texture map represents the water region. Each grid point is then associated with the closest correspondingly located point in the reflected texture map.

For each vertex of the grid, the foregoing processes for distorting the water region (with or without having added a periodic wave) are performed. However, in this case, the differences that are computed are added to the grid coordinates of the vertex under consideration to specify a different vertex location. The texture coordinates associated with this different vertex are assigned to the vertex under consideration in lieu of the last-assigned texture coordinates.

In order to accomplish the just-described texture coordinate shifting technique, a height value is assigned to each vertex of the grid, just as in the image space application. However, in this case the unit height of the height map is scaled to be an integer. The height values generated by the periodic wave model or introduced via the ripple addition feature are scaled likewise. In this way, the computed differences are in integer form and when added to the vertex coordinates under consideration will specify another vertex location on the grid. Given the foregoing, it is noted that the factor used in the distortion computations in image space is set to one for texture space computations. It is also noted that the processes by which the new height values are computed to generate a new height map for the next frame in the video, involved dividing the sum of the height values of neighboring height map locations by two, and in the case of ripple damping, further dividing the resultant height value by a prescribed number. In the texture space shifting technique these same processes are followed to compute new height values for each grid vertex, except that integer computation techniques are employed to ensure the results are in integer form.

DESCRIPTION OF THE DRAWINGS

The specific features, aspects, and advantages of the present invention will become better understood with regard to the following description, appended claims, and accompanying drawings where:

Figures 3, 6:
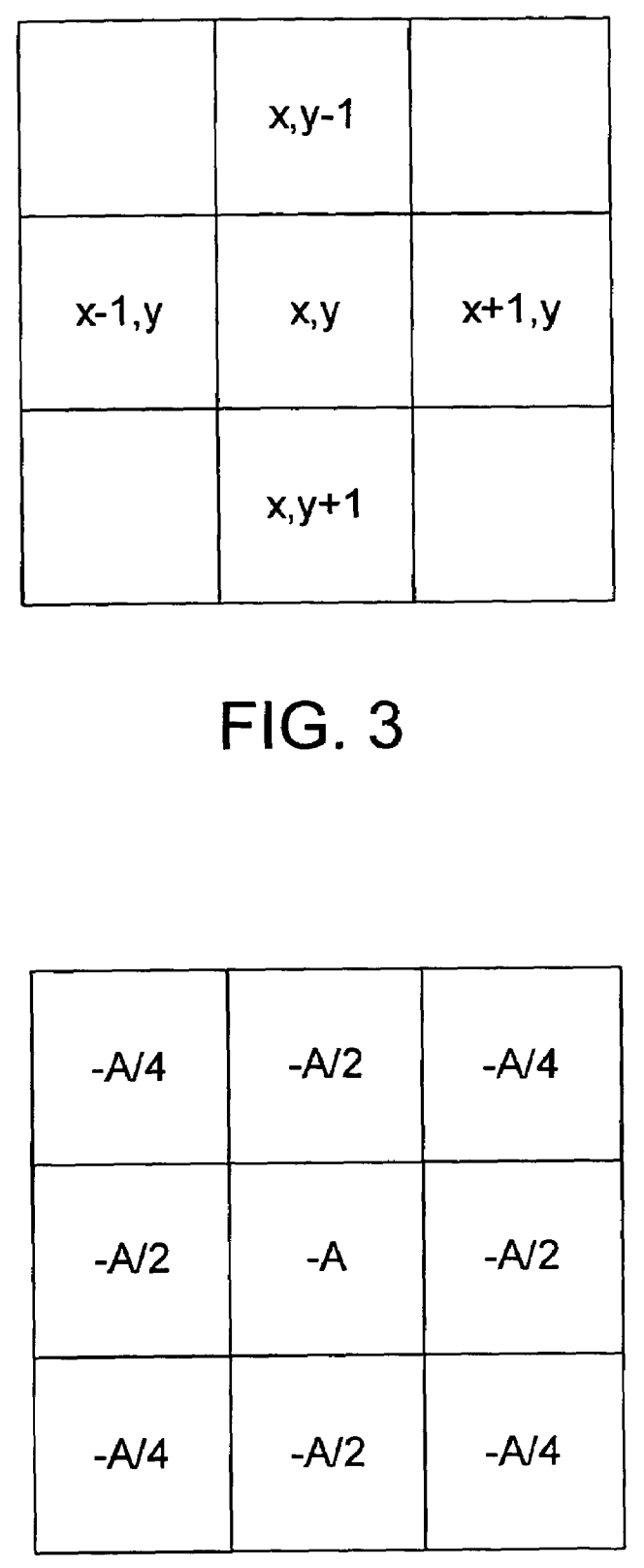

FIG. 3 is a diagram exemplifying the direction convention for neighboring locations in a height map employed in the computations associated with the present invention.

FIG. 6 is a diagram illustrating a ripple mask used for tested embodiments of the present invention.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
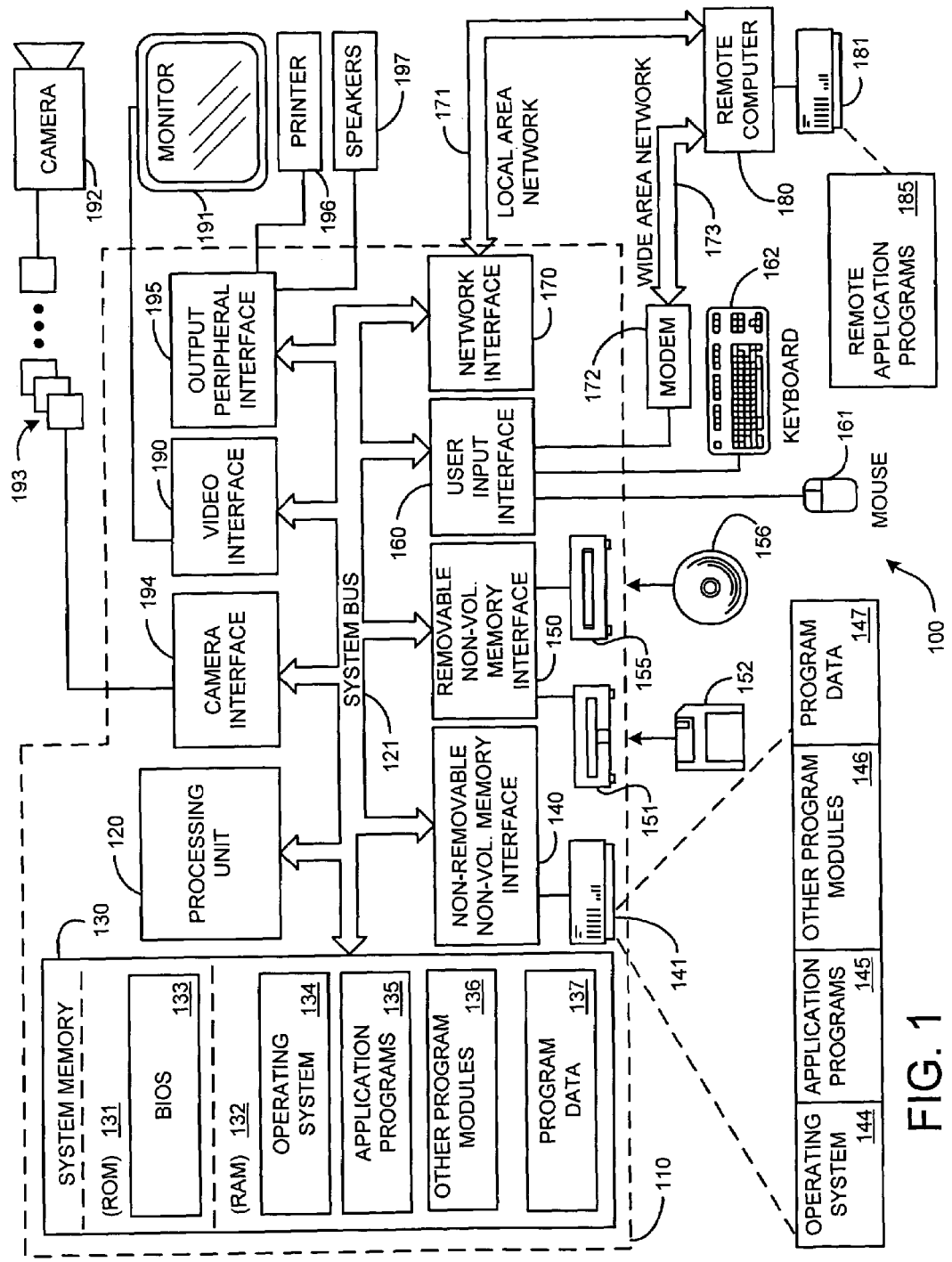
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
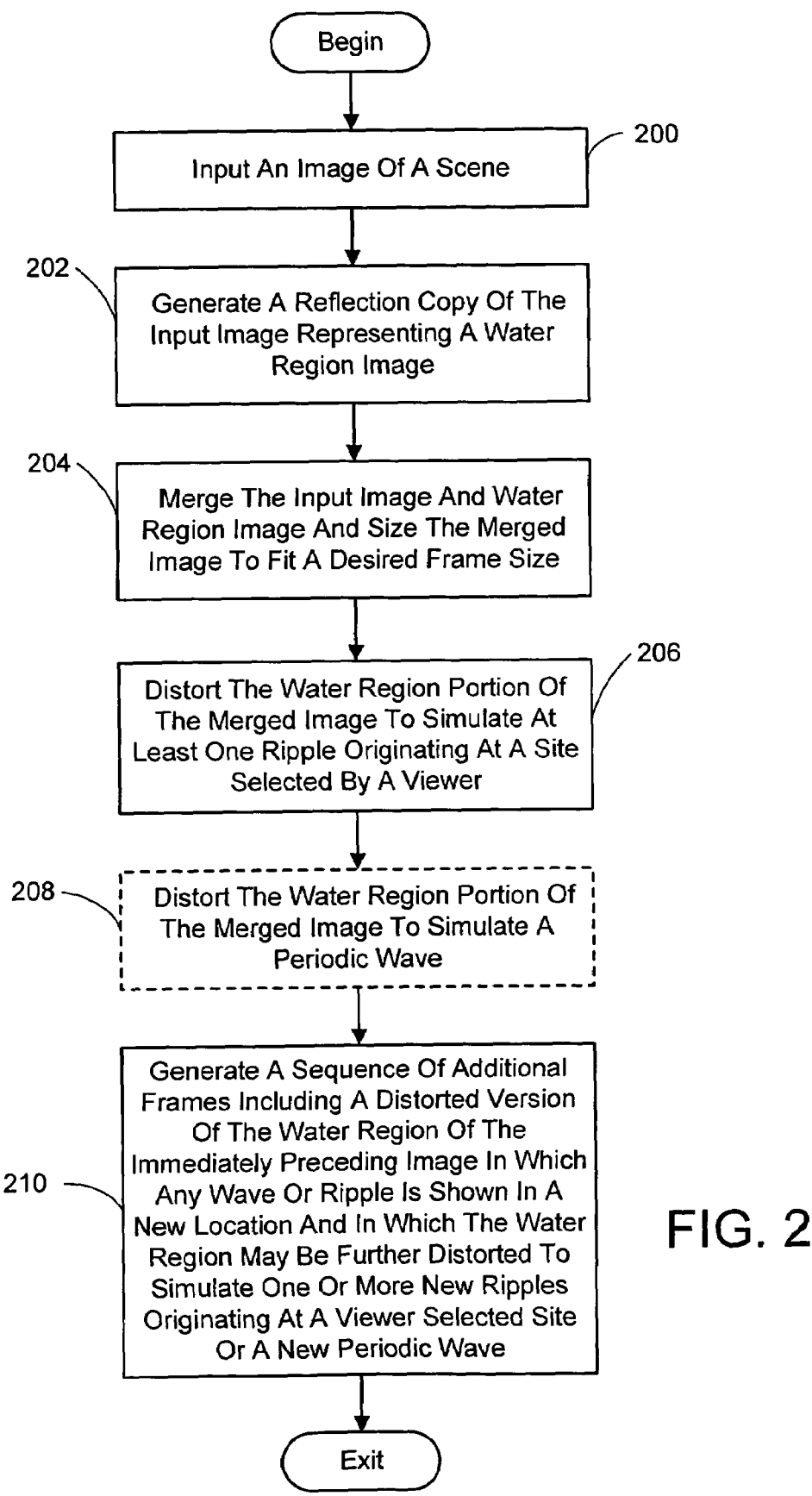
FIG. 2 is a flow chart diagramming an overall process for generating video that includes interactive water effects.

The exemplary operating environment having now been discussed, the remaining part of this description section will be devoted to a description of the program modules embodying the invention. The system and process according to the present invention essentially involves generating video that includes interactive water effects. In general, this is accomplished via the following process actions, as shown in the high-level flow diagram of FIG. 2:

a) inputting an image of a scene (process action 200);

b) generating a reflection copy of the scene depicted in the input image to create a water region image (process action 202);

c) merging the input image and water region image and sizing the merged image to fit a desired frame size to produce a frame of the video (process action 204);

e) distorting the water region portion of the merged image to simulate at least one ripple originating at a site selected by a viewer (process action 206);

f) optionally distorting the water region portion of the merged image to simulate a periodic wave (process action 208);

g) generating a sequence of additional frames, each of which comprises a distorted version of the water region of the immediately preceding image starting with the first distorted video frame in which any wave or ripple simulated in the immediately preceding frame is shown in a new location chosen so as to simulate the natural motion of a wave or ripple across the surface of a body of water, and in which the water region is optionally further distorted to simulate one or more new ripples originating at a viewer selected site or a new periodic wave (process action 210).

The numbered sections to follow will describe each of these actions in more detail, as well as variations that can be employed to enhance the usefulness of the present invention.

1.0 Generating the First Video Frame with Water Effects

The input image can be any digital or digitized image that is capable of being displayed on the display device, such as a computer monitor, associated with a computing system, such as one of those described above. In general, the scene depicted in the image will become the top portion of the aforementioned merged image with the water region occupying the lower portion of the frame. The reflection copy of the input image is simply an image that is essentially identical to the input image but reversed, like a mirror image of the scene. However, it is also possible to introduce a reflection attenuation factor. This factor would be applied to each pixel of the reflection copy to scale down its intensity by a prescribed or viewer-selected ratio. This would have the effect of simulating murky water that would not create a perfect reflection of the surrounding scene.

The input image and its reflection copy are merged by joining the bottom edge of the input image with the bottom edge of the reflection image. Thus, the reflection copy is upside-down. Once merged the joined images are sized to fit the desired frame size. Any conventional image processing program capable of manipulating the input image in the aforementioned manner can be employed to accomplish the creation of the reflection copy, merging and sizing tasks.

2.0 Distorting the Water Region

The merged image is distorted to depict viewer-initiated ripples, periodic waves, or both. In general, these water effects are added to the reflected image region using a 2D height map that represents the surface of the water. This height map has a plurality of points each of which is assigned a height value. These map points correspond to image points in the water region the merged image. Typically, it is desirable to have a different height map point correspond to each pixel in the water region of the merged image. The technique for introducing a periodic wave into the merged image using the height map will be described next, followed by a description of the introduction of a ripple by the viewer.

2.1 Introducing Periodic Waves

The water region can be distorted to simulate a periodic wave motion whether or not a ripple is introduced by the viewer. This relates to the real world situation where the wind, or some other cause, produces waves on the surface of a body of water. This periodic or basic wave is generally incorporated into the merged image by using a basic wave module to generate height values for each height map location, and then adding these values to the current heights assigned to the corresponding map locations. The summed height values are then used to distort the water region of the water-added image as will be explained shortly. It is noted that the height values generated by the basic wave module simulate the shape and location of a wave on the surface of the water region at a given point in time, and in addition, the module generates a new set of height values at each succeeding time increment that simulate the shape and location of the wave at it propagated across the surface of the water. These new height value sets will be used to create subsequent frames of the video as will be described later.

Any conventional wave generating module can be employed to generate the aforementioned height values. However, in tested embodiments of the present invention, a 1D basic wave module was employed. This module simulates a wave on the surface of the water that travels in one direction and has the same height across the entire water region for each row of the height map in the direction perpendicular to the direction of propagation. Specifically, the height values for the 1D basic wave were generated using the following equation:

```
for (t=0; t<S_bw; t++)
{
    α_t=2πt/S_bw;
    for (i=0; i<GridY; i++)
    {
        A_curr = A_bw / GridY x i;
        α = GridY / (i+ GridY/4) × D_bw + α_t;
        BasicWaveHeight(i, t) = A_curr × sin(α);
    }
}
```
(1)

where $S_{bw}$ represents the basic wave spreading speed for which the bigger the value, the slower the wave, $D_{bw}$ is the density of the basic wave, and $A_{bw}$ is the amplitude of the basic wave. It is noted that the foregoing parameters can be prescribed so as to produce a standardized wave, or can be made selectable by a user so that the wave characteristics can be customized. The water region of the merged image is distorted to simulate how the surface of the water would appear with a wave at a starting point in time, as indicated previously. In general, this distortion is accomplished by computing new image coordinates (s,t) for each point in the image corresponding to a height map point. For the sake of convenience, the s-axis of the image is deemed to be horizontally oriented across the depicted water region and the t-axis is deemed to be vertically oriented across the region. Specifically, for each image location in the water region related to a height map point CurrentHeight(x,y), if its original index in the water region is I(s,t), the resulting index would be I(s+Δs,t+Δt) after being distorted. Δs and Δt are defined as the difference of the 4 neighbor heights, as shown in FIG. 3 and the equation:

Δs=((CurrentHeight(x+1,y)+BasicWaveHeight(x+1,y, t))−(CurrentHeight(x−1,y)+BasicWaveHeight(x−1,y,t)))/Factor;

Δt=((CurrentHeight(x,y+1)+BasicWaveHeight(x,y+1, t))−(CurrentHeight(x,y−1)+BasicWaveHeight(x, y−1,t)))/Factor (2)

Figure 4A:
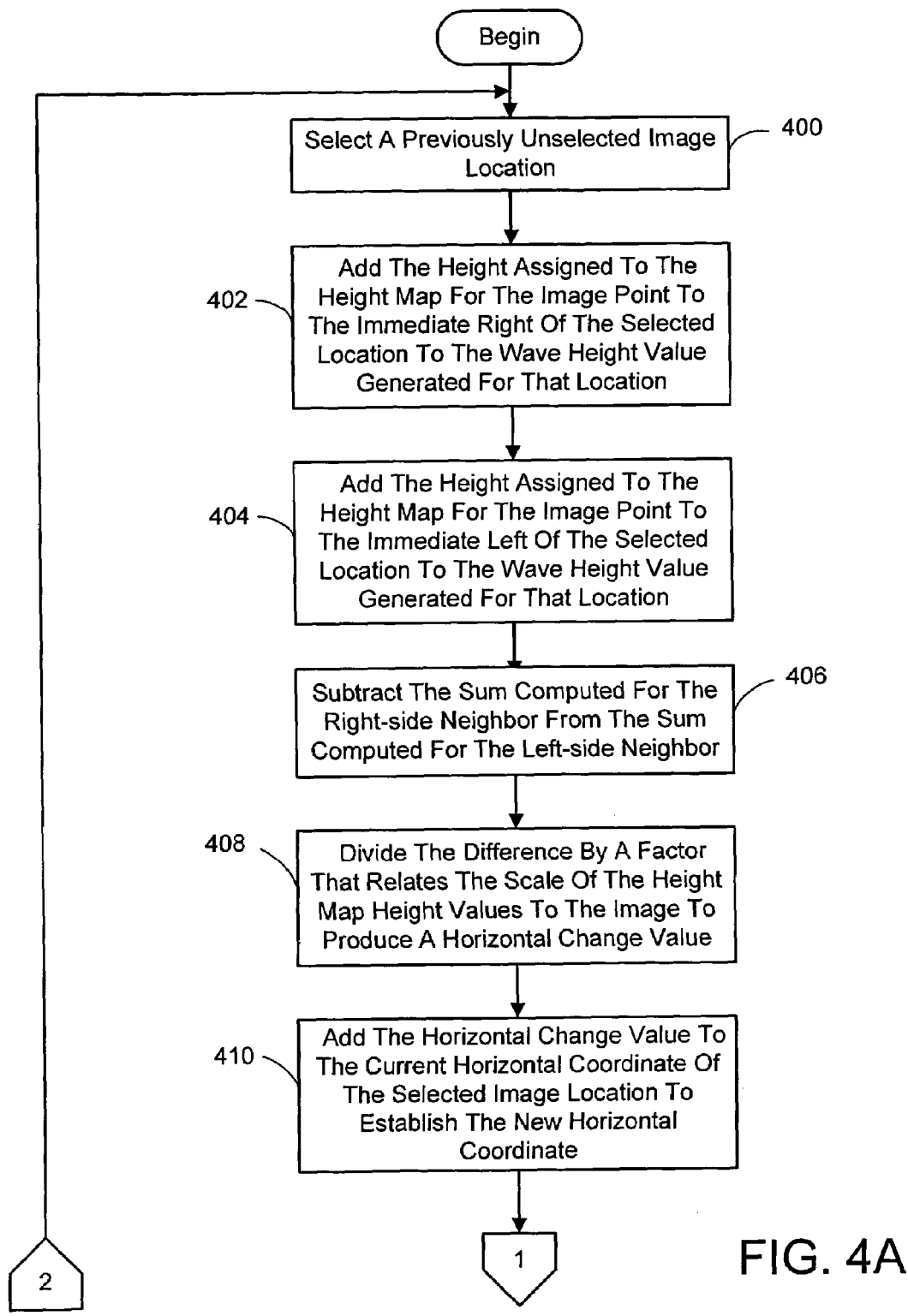
FIGS. 4A and 4B are a flow chart diagramming a process for distorting the water region of a merged image to add a periodic wave that implements the optional wave distortion technique of FIG. 2.
Figure 4B:
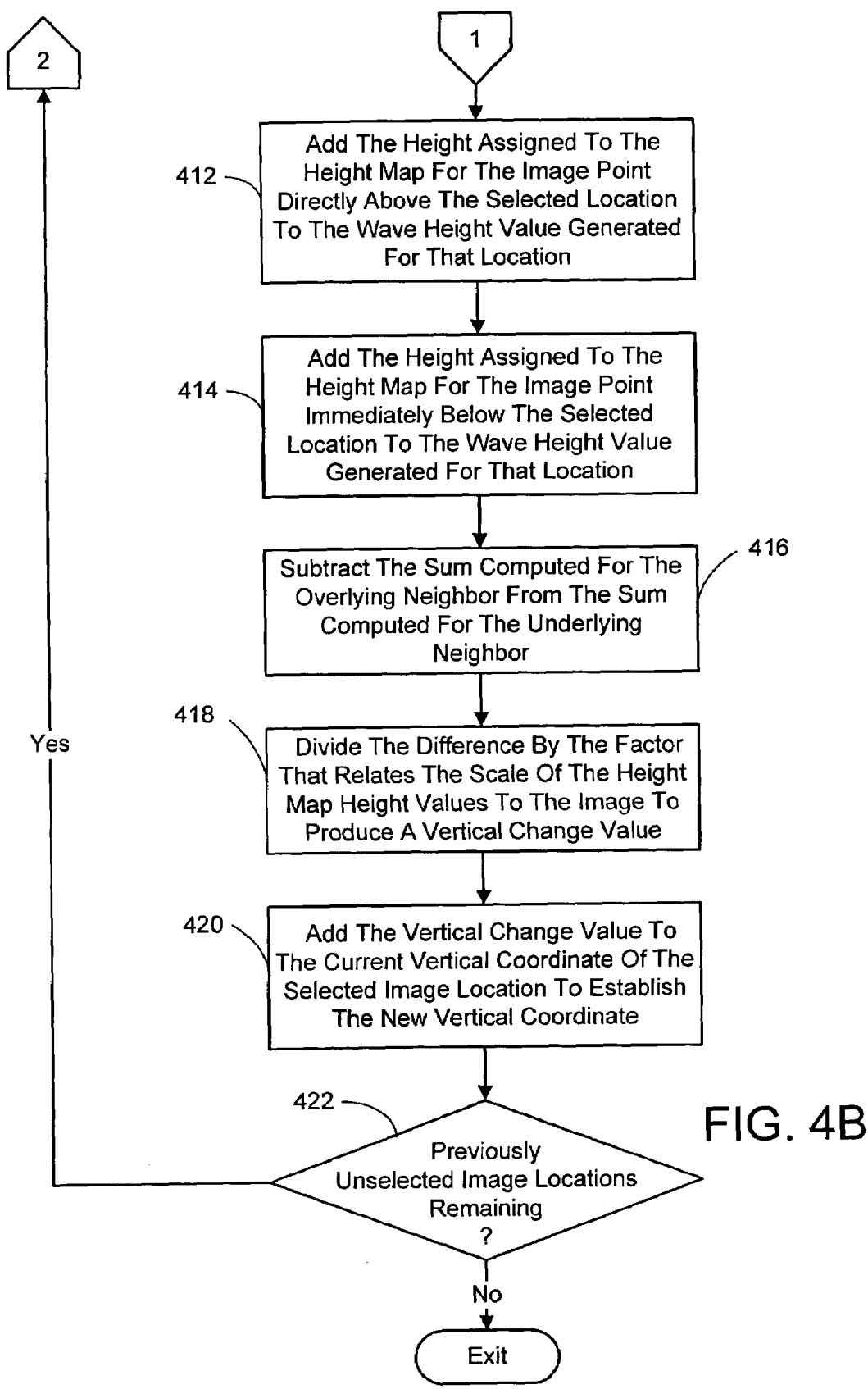

Thus, referring to FIGS. 4A and 4B, the merged image is distorted to add a periodic wave by first selecting a previously unselected image location, which has a corresponding height map value (process action 400). This will be a pixel of the water region if there is a corresponding height map value associated with each pixel, as would be the typical case. The current height assigned to the height map for the image point to the immediate right of the selected location is added to the height value generated by the basic wave module for this same neighboring location at the starting point in time (process action 402). Similarly, the current height assigned to the height map location for the image point to the immediate left of the selected location is added to the height value generated by the basic wave module for that neighboring location at the starting point in time (process action 404). The sum computed for the right-side neighbor is then subtracted from the sum computed for the left-side neighbor in process action 406. The resulting difference is then divided by a factor that relates the scale of the height map height values to the image (process action 408). It is noted that if the height map scale is made to match the image scale the factor is equal to one.

The value computed by the foregoing procedure represents the change in position Δs that is to be applied to the s-coordinate of the selected image location, as indicated above. Thus, the new s-coordinate is computed by adding the computed change in position Δs to the current s-coordinate of the selected image point (process action 410). Notice that under the convention set up by FIG. 3, if the value is positive, the new s-coordinate of the point is located to the right of the current position by the amount of the computed change. Conversely, if the change value is negative, the new s-coordinate of the point is located to the left of the current position by the amount of the computed change.

The new t coordinate for each image point is computed in a similar manner. Specifically, referring to FIG. 4B, the current height assigned to the height map location for the image point directly above the selected location is added to the height value generated by the basic wave module for this same neighboring location at the starting point in time (process action 412). Additionally, the current height assigned to the height map location for the image point immediately below the selected location is added to the height value generated by the basic wave module for that neighboring location at the starting point in time (process action 414). The sum computed for the overlying neighbor is then subtracted from the sum computed for the underlying neighbor (process action 416), and the difference is divided by the aforementioned relational factor (process action 418).

The value computed by the foregoing procedure represents the change in position Δt that is to be applied to the t-coordinate of the selected image location. Thus, the new t-coordinate is computed by adding the computed change in position Δt to the current t-coordinate of the selected image point (process action 420). Here, according to the convention of FIG. 3, if the value is positive, the new t-coordinate of the point is located below the current position by the amount of the computed change. Conversely, if the change value is negative, the new t-coordinate of the point is located above the current position by the amount of the computed change.

It is next determined if there are any remaining previously unselected image locations (process action 422). If so, process actions 400 through 422 are repeated. If not, the process ends.

The foregoing process is simplified somewhat if a 1D periodic wave model is employed, as it was in tested embodiments of the invention. In such a case, the new t-coordinate location for each image point in the water region is found in the same way as described above. However, the new s-coordinate location is simply found by subtracting the current height assigned to the height map location for the image point to the right of the selected point from the current height assigned to the height map location for the image point to the left of the selected point, and then using the resulting change value Δs to determine new s location. Thus, $$\Delta s = \text{CurrentHeight}(x+1,y) - \text{CurrentHeight}(x-1,y);$$

$$\Delta t = (\text{CurrentHeight}(x,y+1) + \text{BasicWaveHeight}(y+1,t)) - (\text{CurrentHeight}(x,y-1) + \text{BasicWaveHeight}(y-1,t)) \quad (3)$$

This simplification was found to produce a realistic wave effect, while at the same time reducing the amount of processing required to generate each frame of the video.

2.2 Introducing Ripples Interactively

Figure 5:
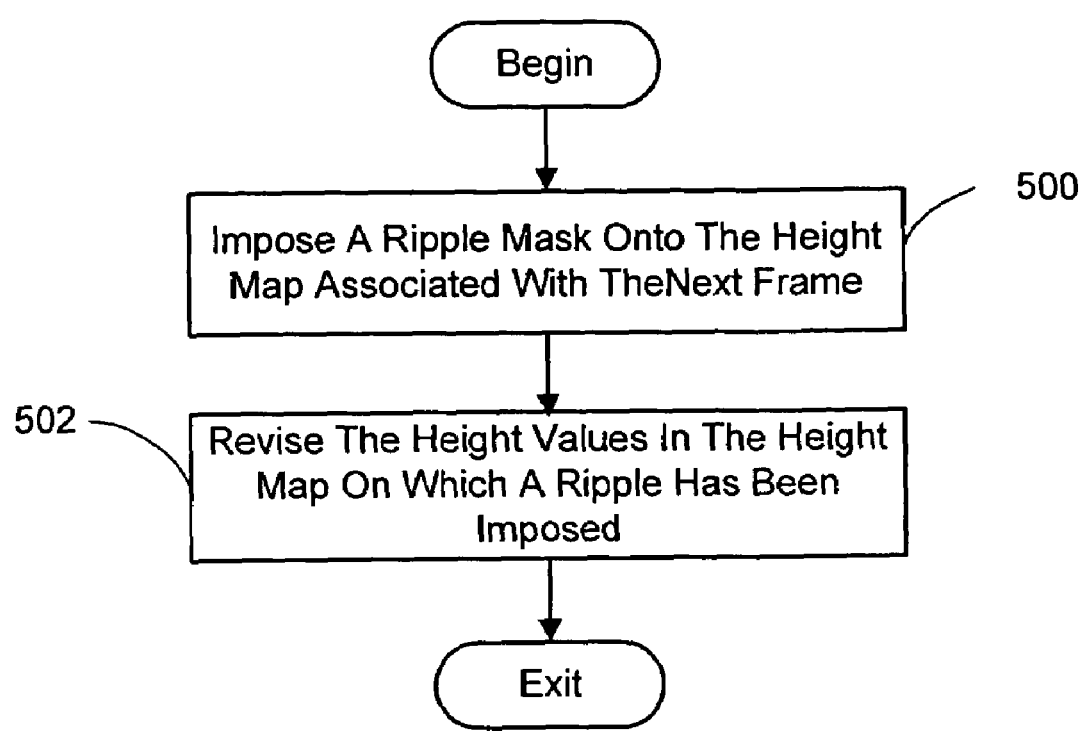
FIG. 5 is a flow chart diagramming a process for distorting the water region of a merged image to add a ripple that implements the interactive ripple distortion technique of FIG. 2.

Ripples are added interactively by allowing a viewer to select a point in the water region of a displayed frame of the video. This point becomes the ripple center. Essentially, referring to FIG. 5, the ripple is added by imposing a ripple mask onto the height map associated with the next frame to be generated (process action 500). The mask identifies a series of height values that are used to modify the currently assigned height values of the height map locations in a neighborhood centered about the location corresponding to the selected point in the displayed water-added image. For example, if a ripple that has the amplitude of A is to be added onto the height map, the mask illustrated in FIG. 6 can be employed to modify the heights of the region surrounding the ripple center. The ripple amplitude can be either a positive or negative value, although a negative value was used in the tested embodiments to simulate an object dropping into the water, thereby creating a localized depression in the water's surface. In addition, the ripple amplitude can be selectable by the viewer so that the magnitude of the disturbance to the water's surface can be customized. The current height values in the height map on which a ripple has been imposed are revised accordingly (process action 502). This is done prior to computing new image coordinates for each point in the water region, or adding any height values associated with a periodic wave.

It is noted that more than one ripple can be added to the same frame by having multiple ripple centers selected and by applying each of multiple ripple masks in the manner described above. This could be used to, for example, simulate rain falling onto the surface of the water. It is further noted that the ripple amplitude need not be the same for each ripple added to a frame, and can be made selectable by the viewer introducing the ripple. Thus, the ripple feature of the present invention allows real time interaction by allowing a viewer to add ripples of different amplitudes to the height map of each frame of the video being generated.

In the case where a ripple is added to a frame, but no periodic wave is present, the new image coordinates are computed as follows.

$$\Delta s = (\text{CurrentHeight}(x+1,y) - \text{CurrentHeight}(x-1,y))/\text{Factor};$$

$$\Delta t = (\text{CurrentHeight}(x,y+1) - \text{CurrentHeight}(x,y-1))/\text{Factor}; \quad (4)$$

Thus, the water region is distorted by computing new image coordinates (s,t) for each point in the image corresponding to a height map point, however, without adding in any additional height value associated with a periodic wave.

3.0 Generating Subsequent Video Frames

The foregoing procedures for adding periodic waves and ripples to the first frame of the video in which it is desired to add such water effects, can be repeated for each succeeding frame generated for the video to add new waves and ripples. In addition, wave and ripple spreading dynamics are added to simulate the motion of these effects over time. Essentially, this is accomplished by computing the heights values for each point in the height map associated with the next frame being generated using the values assigned to the height map of the immediately preceding frame of the video, before imposing any new ripple or adding in the periodic wave heights. Specifically, referring to the location convention illustrated in FIG. 3, the following simulation process is employed to compute a new height value for each height map point:

$$\text{ResultHeight}[x][y] = ((\text{CurrentHeight}[x+1][y] + \text{CurrentHeight}[x-1][y] + \text{CurrentHeight}[x][y+1] + \text{CurrentHeight}[x][y-1]) >> 1) - \text{PreviousResultHeight}[x][y] \quad (5)$$

Figure 7:
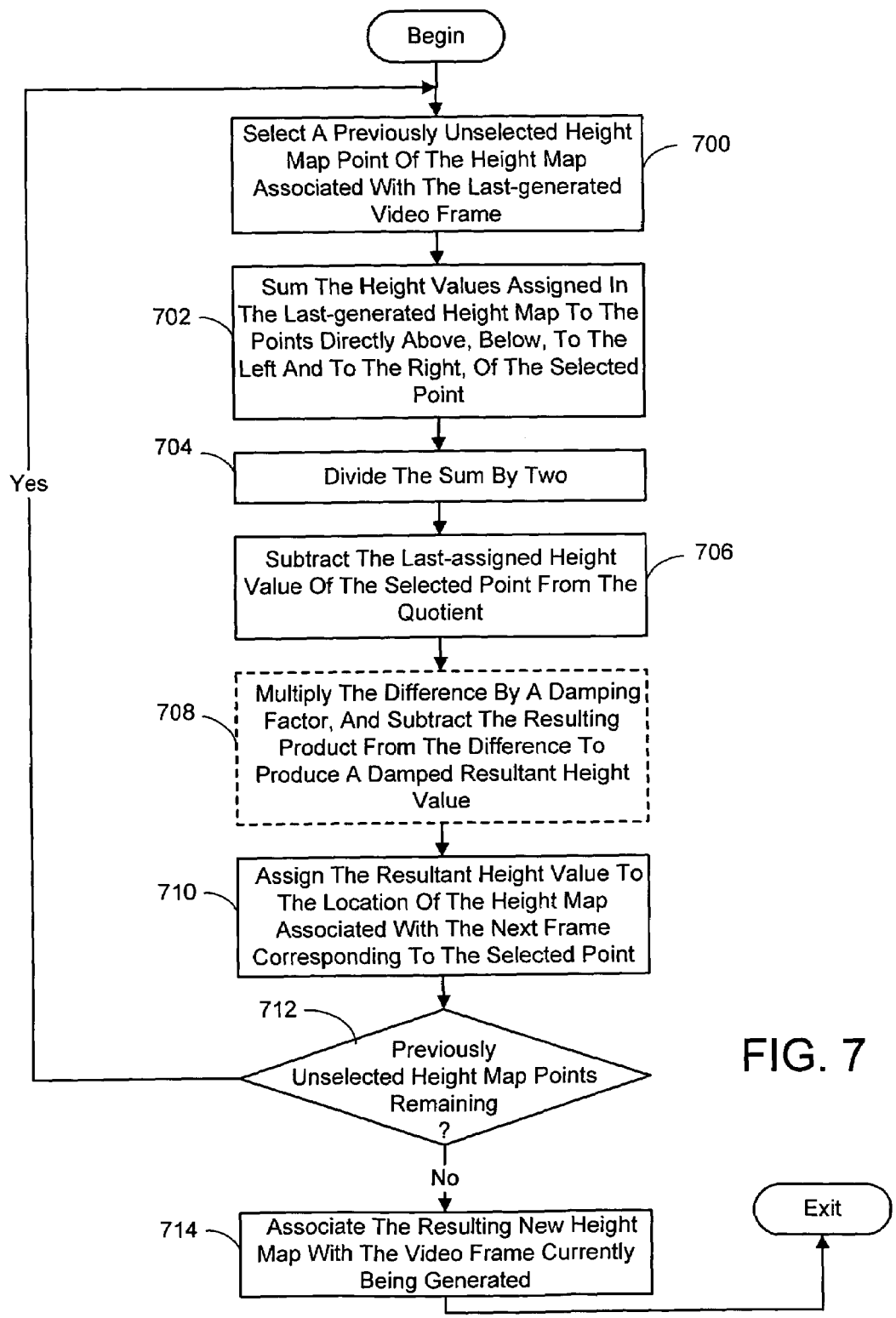
FIG. 7 is a flow chart diagramming a process for simulating the dynamics of waves and ripples over time that implements the video frame generation technique of FIG. 2.

Thus, referring to FIG. 7, a previously unselected height map point of the height map associated with the last-generated frame of the interactive water effects video is selected (process action 700). The height values assigned in the last generated height map to the points directly above and below, as well as directly to the left and to the right, of the selected point, are added together (process action 702). This sum is then divided by two in process action 704 (as approximated using a standard bit shift operation ">>1" to simplify the processing), and the last assigned height value of the selected point is subtracted from the just computed quotient (process action 706). The resulting difference is assigned to the corresponding location in the height map of the next frame to be generated (process action 710). It is next determined if there are any remaining previously unselected height map points (process action 712). If so, then process actions 700 through 712 are repeated until the entire height map has been processed. The resulting new height map is then associated with the video frame currently being generated (process action 714), and the process ends.

It is noted that in the case of adding ripples, an interesting effect can be achieved by adding a succession of new ripples, each adjacent in location to the last, across a sequence of frames. This procedure appears to a viewer as if an object is being dragged through the water and creating a wake of ripples as it goes. One way of accomplishing this effect would be to have the viewer select a new adjacent point in each generated frame of the video by for example, holding down the right button of a mouse and moving the mouse such that a cursor associated therewith moves through the water region in the frames of the video as they are being played to the viewer.

3.1 Adding a Damping Factor

A damping factor can also be optionally applied to simulate a ripple dying out as it spreads across the surface of the water. This is accomplished by, prior to assigning a new resultant height value to a height map location (see process action 710 of FIG. 7), first applying a damping factor. Specifically, if damping is considered, then:

$$\text{ResultHeight}[x][y] -= \text{ResultHeight}[x][y] \times \text{DampingFactor} \quad (6)$$

Thus, referring again to FIG. 7, the height value computed in process action 706 is multiplied by a damping factor, and the product is subtracted from the computed height to produce a damped resultant height (process action 708). It is this damped resultant height that is assigned in process action 710. It is noted that process action 708 is shown in a broken line box in FIG. 7 to identify it as an optional step. The damping factor can be any desired, although a factor of $\frac{1}{16}$ or $\frac{1}{32}$ was found to provide realistic looking ripple damping in tested embodiments of the present invention. In addition, the factor can be prescribed or made selectable by the viewer.

It is also noted that the processing associated with Eq. (6) can be simplified using a standard bit shift operation to approximate multiplying by a fractional damping factor. Thus, Eq. (6) becomes:

$$\text{ResultHeight}[x][y] -= \text{ResultHeight}[x][y] >> \text{DampingFactor}', \quad (7)$$

where the DampingFactor' specifies a power of two, such as 4 which equates to a damping factor of $\frac{1}{16}$, or 5 which equates to a damping factor of $\frac{1}{32}$.

4.0 Texture Coordinate Shifting

While the foregoing processes for distorting an image directly by moving pixels to new locations based on a height map is straightforward, it can be computationally intensive, especially if done on a pixel by pixel basis. The processing requirements can be reduced by manipulating texture space rather than image space, if the frame being generated is rendered using a 3D model of the scene and an associated texture map. One benefit of this reduction in processing requirements is that the generation of full screen image frames is made possible, even for lower power computing systems.

Figure 8:
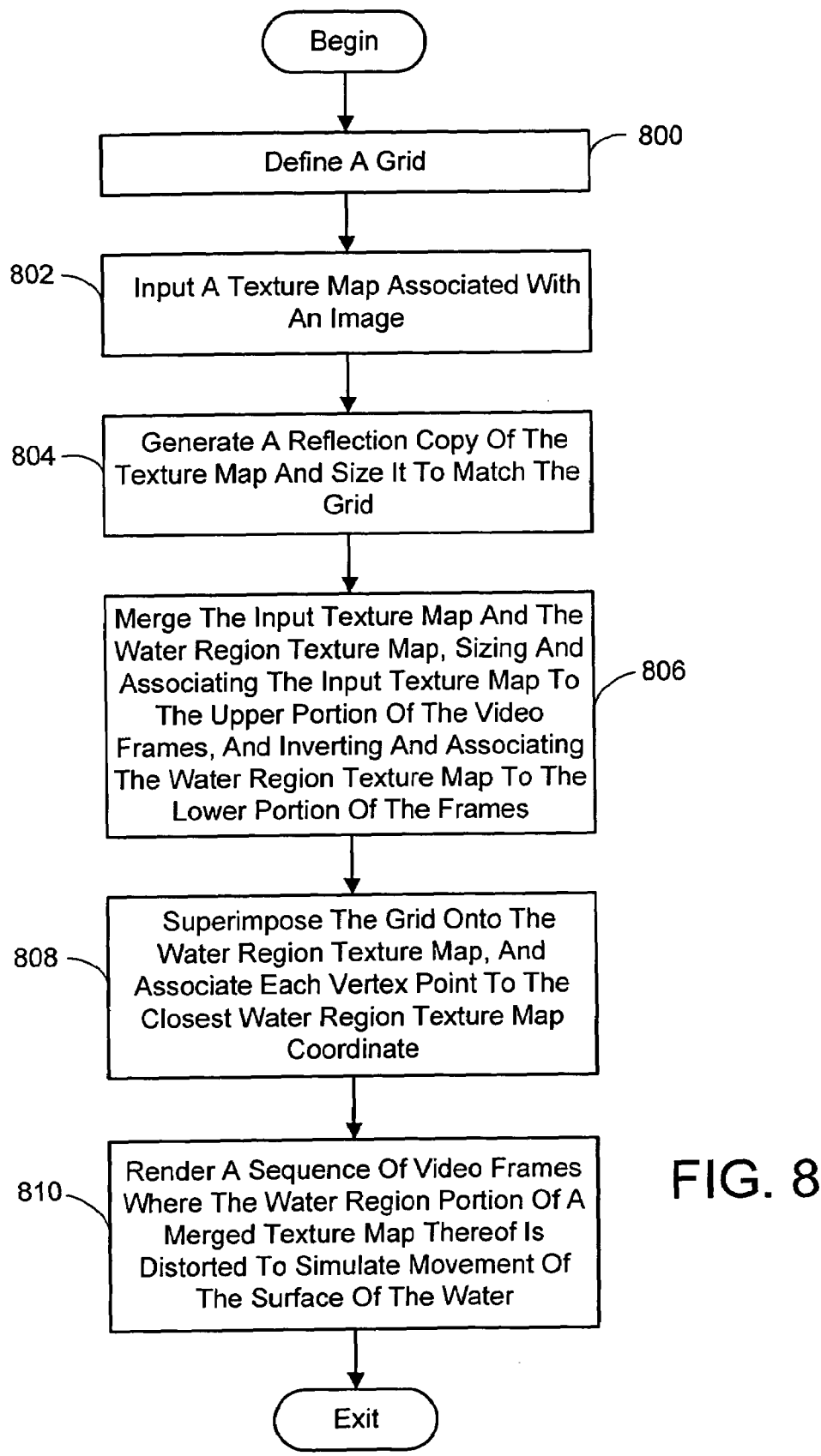
FIG. 8 is a flow chart diagramming an overall process for generating video that includes water effects rendered using texture coordinate shifting.
Figure 9:
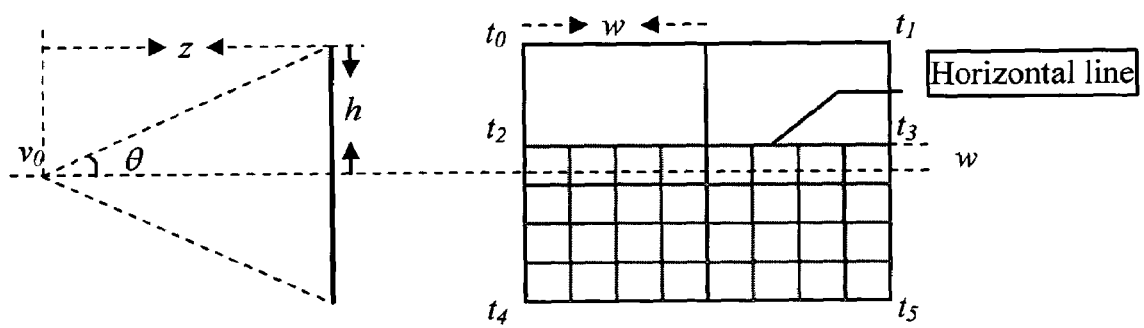
FIG. 9 is a diagram illustrating the geometry involved with defining an orthogonal grid for use in the process of FIG. 8.

Referring to the process outlined in FIG. 8, the first task in generating a video simulating water effects by shifting texture is to define an orthogonal grid for use in the height and difference computation (process action 800). Essentially, this grid will act as the height map discussed previously. It is constructed of a plurality of horizontal and vertical grid lines which define a series of vertices where the lines cross. The grid is sized to match the desired size of the water region of each frame of the video. Specifically, referring to FIG. 9, $v_0$ is the view point; z is the distant between view point and the scene plane; θ is the half-view-angle; h is a half of the vertical size of the plane; and w a half of the horizontal size of the plane. Given the view-angle of the desired frame size, the distance z, and the display screen window size $(w_w, w_h)$, h and w can be computed as follows:

$$h = z \tan \theta, \text{ and} \quad (8)$$

$$w = h \times w_w / w_h. \quad (9)$$

If the view point is set at $v_0(0, 0, z)$, that is, if the center of the plane is $(0, 0, 0)$, the four vertices of the plane would be: $t_0(-w, h, 0)$, $t_1(w, h, 0)$, $t_4(-w, -h, 0)$, and $t_5(w, -h, 0)$.

The grid can then be generated, given the horizontal and vertical grid resolutions and the height of the dividing line between the input image and the added water region. The grid extends down from the specified dividing line to the bottom of the scene plane and has the specified number of grid lines. It is noted that the scene plane would equal the desired frame size, which would be the entire display screen size if a full screen video is desired.

Figure 10:
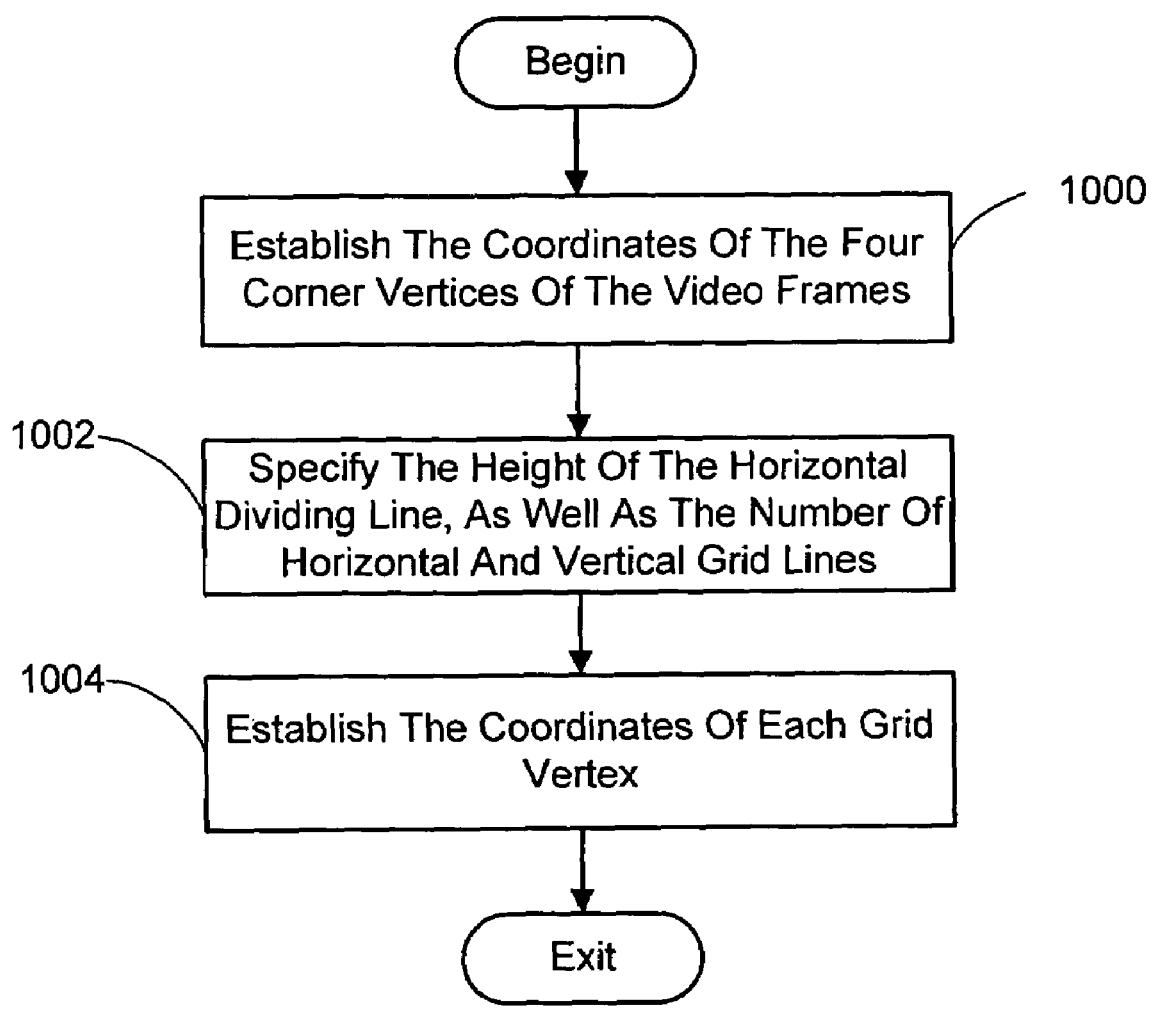
FIG. 10 is a flow chart diagramming a process for establishing an orthogonal grid that implements the grid definition technique of FIG. 8.

Thus, referring to the process outlined in FIG. 10, the orthogonal grid is defined by first establishing the coordinates of the four corner vertices of the video frames, as described above (process action 1000). Then, the height of the horizontal line in terms of the overall height of the desired frame size that divides the water region and the rest of the scene in the video frames, as well as the number of horizontal and vertical grid lines, are specified (process action 1002). These can be default values or entered by the viewer. Given the height of the horizontal dividing line and the number of horizontal and vertical grid lines, the grid coordinates of each vertex are established (process action 1004). It is noted that the horizontal and vertical grid lines are equally spaced in their respective directions. Further, the number of grid lines defines the coarseness of the grid. A finer grid (i.e., more grid lines) will produce a more realistic looking water region in the video, but at the expense of additional processing. Thus, if processing power is a concern, the number of grid lines in each direction should made just large enough to produce an acceptable resolution for the added water region, but no more. It is further noted that making the horizontal grid spacing larger than the vertical grid spacing will add a desirable perspective effect.

Referring once again to FIG. 8, a texture map that is used in conjunction with a model of a scene to generate the image it is desired to add water effects to, is input (process action 802). A reflection copy of the texture map is generated next, and sized to match the overall size of the grid (process action 804). This reflection copy will eventually act as the basis for a water region texture map of the frames. The input texture map and the water region texture map are merged, with the input texture map being sized to fit and associated with the upper portion of the video frames (i.e., the region above the previously specified horizontal dividing line), and the water region texture map being inverted and associated with the lower portion of the frames (process action 806). Thus, the water region of a frame rendered using the merged or combined texture map will appear to be an upside down version of the scene associated with the input texture map. The grid is superimposed onto the water region texture map, and each vertex point of the grid is associated with the closest water region texture map coordinate (process action 808). The merged texture map represents the basis from which the frames of the video are generated. Specifically, as indicated in process action 810, a sequence of video frames is rendered where the water region portion of a merged texture map associated with each frame in which water effects are to be depicted is distorted to simulate movement of the surface of the water in the water region.

Figure 11A:
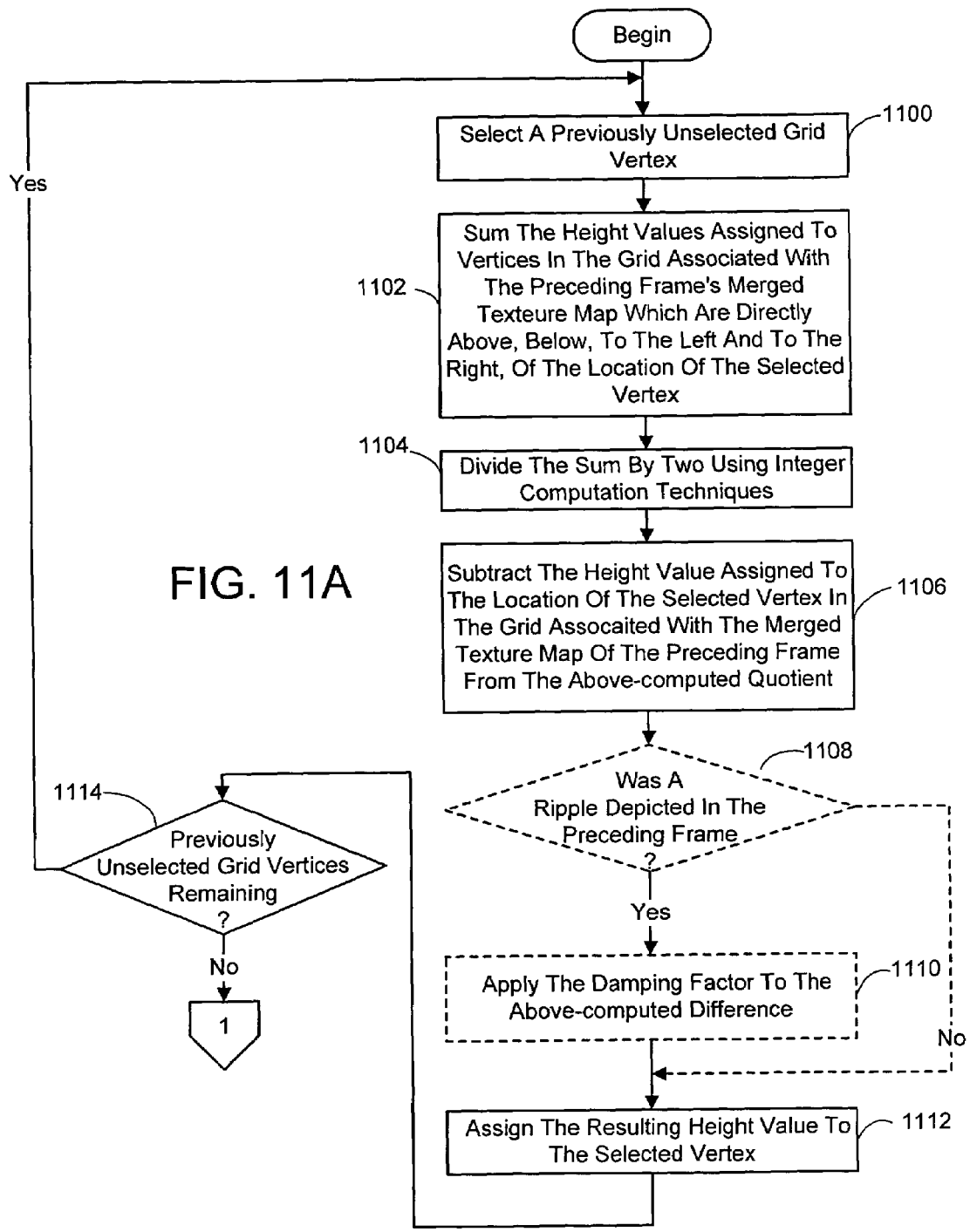
FIGS. 11A–D are a flow chart diagramming a process for distorting a texture map used to render a sequence of video frames exhibiting water effects that implements the distortion technique of FIG. 8.
Figure 11B:
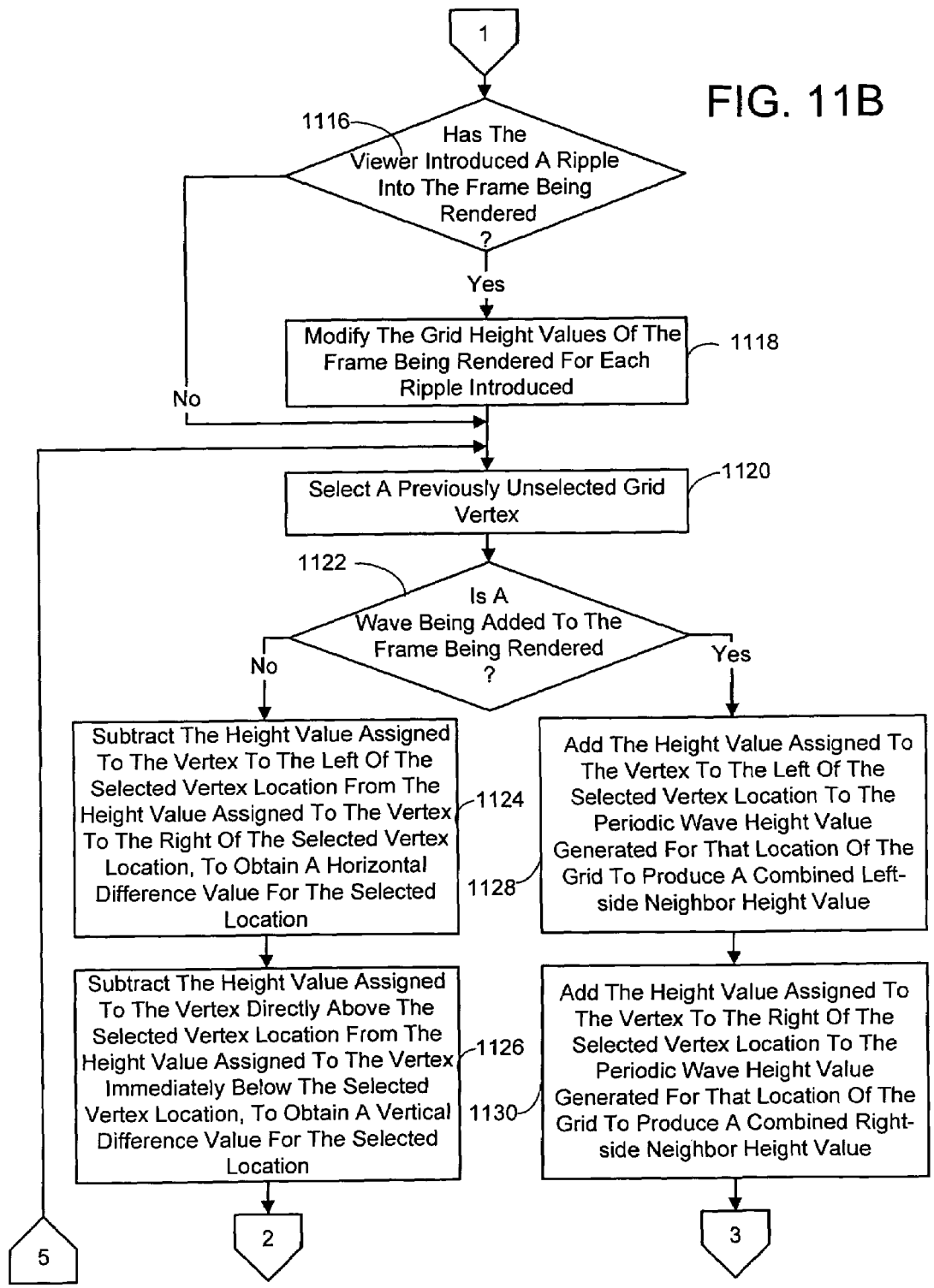

The aforementioned distortion of the texture maps is essentially accomplished using height values assigned to the vertices the grid associated with the water region portion of the respective merged texture maps used to render each respective frame. The height values assigned to the vertices of each grid are varied from frame-to-frame in such a way that the water region of a frame depicts the desired water effects (e.g., waves and/or ripples) and each subsequent frame depicts these water effects as they would appear later in time (e.g., depicting the waves and/or ripples propagating across the surface of the water). In addition, new waves and ripples can be added to any frame. Further, the unit height of the height values assigned to a vertex of the grid associated with a combined texture map is scaled so that all height values are integer numbers. This simplifies the processing and facilitates the identification of new texture coordinate associations as will be discussed shortly. Specifically, the distortion of the texture map for each frame in the sequence having water effects is accomplished as follows. Referring to FIGS. 11A–D, a previously unselected grid vertex is selected (process action 1100). Next, height values are initially assigned to each vertex of the grid associated with the merged texture map for the frame under consideration using the process described previously in connection with Eq. (5) and FIG. 7. Namely, the height values assigned to vertices in the grid associated with the immediately preceding frame's merged texture map which are directly above and below, and directly to the left and to the right, of the location of the selected vertex, are summed (process action 1102). It is noted that for the first frame in the sequence depicting water effects, it is assumed the height values associated with its immediately preceding frame are all zero. The height value sum is then divided by two using integer computation techniques to ensure the resulting height value is in integer form (process action 1104). Next, the height value assigned to the location of the selected vertex in the grid associated with the merged texture map of the immediately preceding frame is subtracted from the computed height value quotient (process action 1106). This value represents the height value for the location associated with the selected vertex. It is noted that the optional damping action described previously in connection with damping ripples in frames generated subsequent to their inception (see Eqs. (6) or (7) and FIG. 7), can be implemented at this point in the process. To this end, an optional process action 1108, involves determining if a ripple was depicted in the immediately preceding frame. If so, then the damping factor is applied to the computed height value as described previously (process action 1110). If not, then this action is skipped. The optional nature of these actions is indicated in FIG. 11A by the broken line boxes associated with the action. In process action 1112, the computed, and possible damped, height value is assigned to the selected vertex. It is next determined if there are any remaining previously unselected vertices of the grid associated with the merged texture map for the frame under consideration (process action 1114). If so, process actions 1100 through 1114 are repeated as appropriate. Referring now to FIG. 11B, if there are no remaining previously unselected vertices, the process continues with a determination of whether the viewer has introduced a ripple into the frame being rendered (process action 1116). The viewer introduces a ripple in the same way as described previously by selecting one or more sites in a currently displayed frame of the video as it is being played. Each selected site represents the center of a ripple which is included in the next frame rendered. If the viewer has introduced one or more ripples, the grid height values of the frame being rendered are modified for each ripple introduced (process action 1118), as described in connection with adding ripples directly to water-added video frames. Namely, referring now to FIG. 12, for each viewer-selected location, an integer height value representing the ripple amplitude of the ripple being simulated is added to the existing height value assigned to the vertex corresponding to the texture map coordinates associated with the viewer-selected location (process action 1200). In addition, an integer height value representing one-half of the ripple amplitude is added to the assigned height values of vertices corresponding to the texture map coordinates associated with frame locations above, below, to the right and to the left of the viewer-selected location (process action 1202). And finally, an integer height value representing one-quarter of the ripple amplitude is added to the assigned height values of vertices corresponding to the texture map coordinates associated with frame locations directly diagonal to the viewer-selected location (process action 1204). As before the height value associated with the ripple amplitude can be prescribed or selected by the viewer, and can be the same or different for each viewer-selected frame location. However, whatever amplitude is chosen it must be an integer, as well as the numbers representing one-half and one-quarter of the amplitude, in order to ensure the height values ultimately assigned to the grid vertex locations are also integers.

Once the grid height values have been modified to incorporate any ripples, the grid is ready for use in distorting the merged texture map in a way that will result in a frame exhibiting the desired water effects. When dealing with image space, a new physical location was computed for each point in the water region that corresponded to a height map point. However, in texture space, this is not necessary. Since the texture map coordinates are associated with points in the frame being rendered, all that need be done is to change the associations to simulate the water effects. The previously described processes for distorting the water region of a frame in image space are performed on the merged texture map, either with an added periodic wave (i.e., see Eq. (2) or (3)) or without an added periodic wave (i.e., Eq. (4)), and where the scaling factor is ignored. However, a new, post-distortion texture coordinate is not actually computed for the selected vertex location t(s,t) whose assigned texture coordinate is originally $T_{s,t}$. Rather, the texture coordinate assigned to vertex t'(s+Δs,t+Δt), namely $T_{s+\Delta s, t+\Delta t}$, are used. Specifically, the computed differences (Δs, Δt) are added to the grid coordinates of the selected vertex location to specify a different vertex location. The texture coordinates associated with this different location are assigned to the selected vertex in lieu of the last-assigned texture coordinates.

To this end, referring again to FIG. 11B, a previously unselected vertex location on the grid is selected (process action 1120). It is then determined if a periodic wave is to be added to the frame being rendered (process action 1122). If not, then the height value assigned to the vertex to the left of the selected vertex location is subtracted from the height value assigned to the vertex to the right of the selected vertex location, to obtain a horizontal difference value for the selected location (process action 1124). In addition, the height value assigned to the vertex directly above the selected vertex location is subtracted from the height value assigned to the vertex immediately below the selected vertex location, to obtain a vertical difference value for the selected location (process action 1126).

Figure 11C:
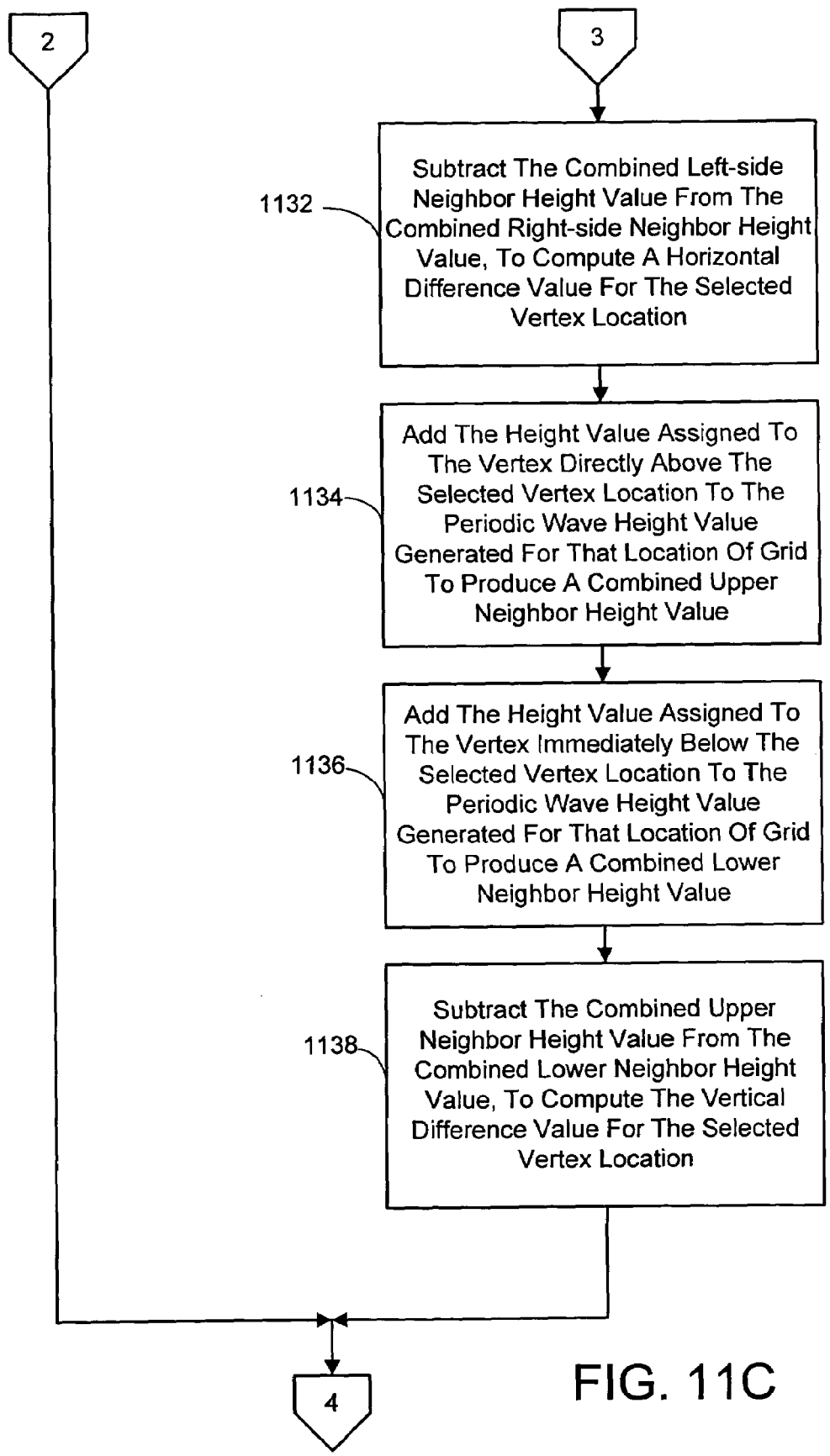
Figure 12:
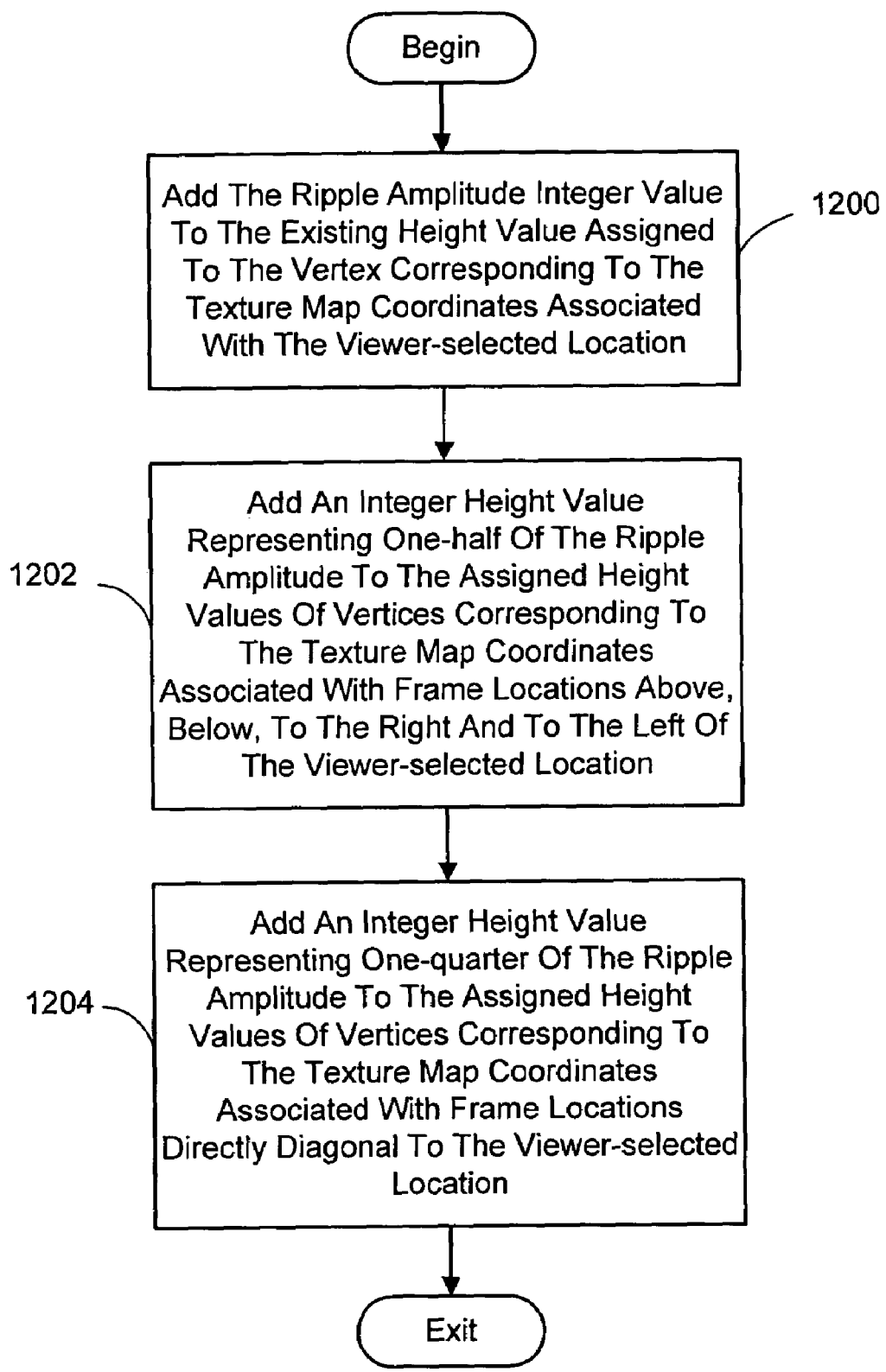
FIG. 12 is a flow chart diagramming a process for distorting the water region of a merged texture map to add a ripple to a video frame being rendered from the texture map that implements the interactive ripple introduction technique of FIGS. 11A–D.

Alternately, if it is determined that a periodic wave is to be added to the frame being rendered in process action 1122, then the height value assigned to the vertex to the left of the selected vertex location is added to a periodic wave height value generated for the same location of grid to produce a combined left-side neighbor height value (process action 1128). In addition, the height value assigned to the vertex to the right of the selected vertex location is added to the periodic wave height value generated for that location to produce a combined right-side neighbor height value (process action 1130). It is noted that the periodic wave height values are generated in the same way as described previously in connection with distorting a water-added region of an image directly. Namely, periodic wave height values are generated for each grid vertex location associated with each combined texture map of each frame in the sequence of frames in which a periodic wave is to appear, for example by employing Eq. (1). Each set of periodic wave height values associated with the grid of a texture map simulates the shape and location of a wave on the surface of a body of water at a point in time corresponding to the order in which the frame generated using the texture map is scheduled to be played. Referring now to FIG. 11C, the process continues by subtracting the combined left-side neighbor height value from the combined right-side neighbor height value, to compute a horizontal difference value for the selected vertex location (process action 1132). A vertical difference value is computed similarly. Namely, the height value assigned to the vertex directly above the selected vertex location is added to the periodic wave height value generated for that location to produce a combined upper neighbor height value (process action 1134), and the height value assigned to the vertex immediately below the selected vertex location is added to the periodic wave height value generated for the same location to produce a combined lower neighbor height value (process action 1136). The combined upper neighbor height value is then subtracted from the combined lower neighbor height value, to compute the aforementioned vertical difference value for the selected vertex location (process action 1138).

Figure 11D:
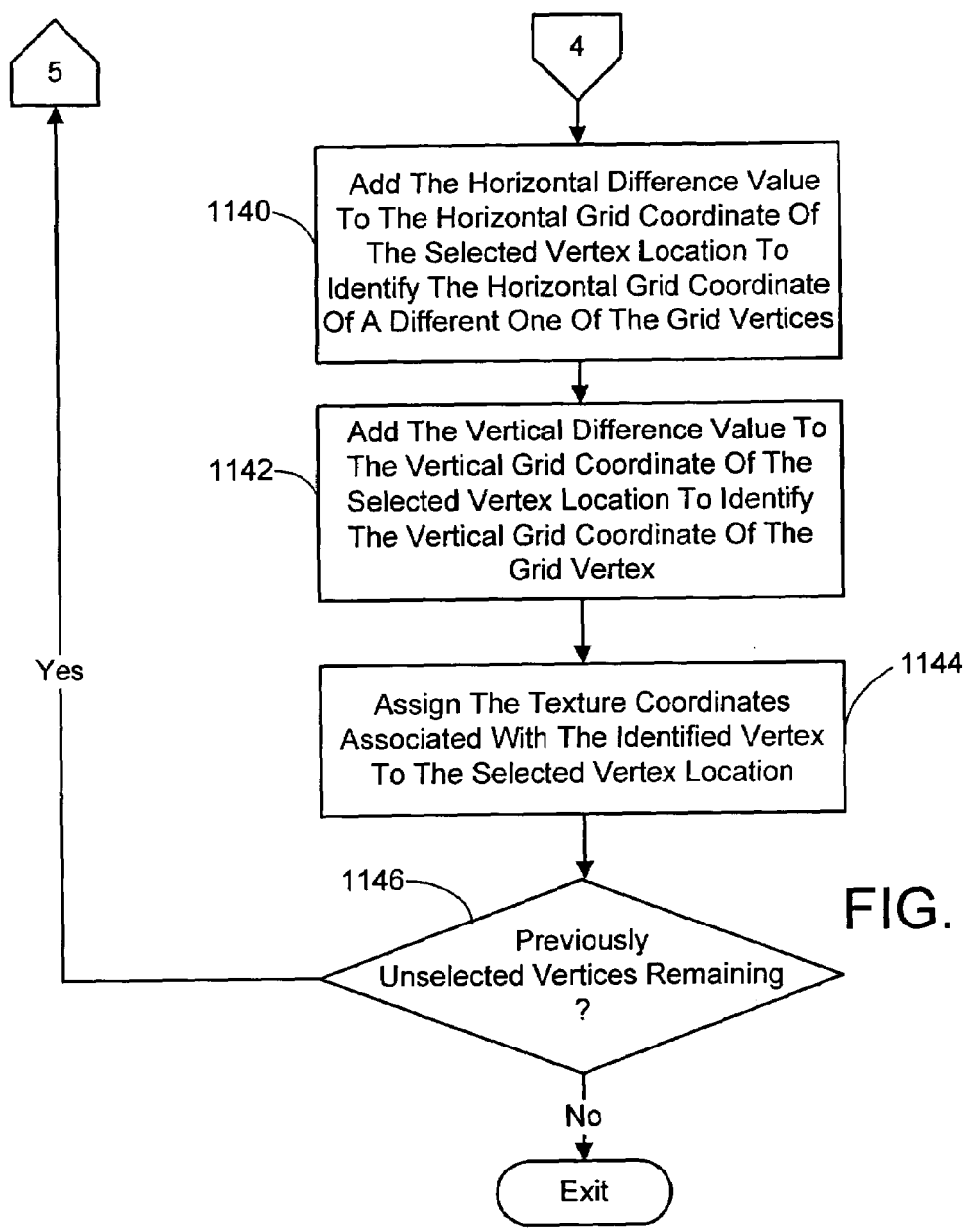

Referring to FIG. 11D, once the horizontal and vertical difference values have been computed either with or without an added periodic wave, the horizontal difference value is added to the horizontal grid coordinate of the selected vertex location to identify the horizontal grid coordinate of a different one of the grid vertices (process action 1140), and the vertical difference value is added to the vertical grid coordinate of the selected vertex location to identify the vertical grid coordinate of the grid vertex (process action 1142). The texture coordinates associated with the identified vertex are assigned to the selected vertex location in lieu of the previously assigned texture coordinates (process action 1144). It is next determined if all the vertex locations of the grid associated with the frame being rendered have been selected (process action 1146). If not, process actions 1120 through 1146 are repeated, as appropriate. Otherwise the process ends. Thus, once all the vertex points are considered, the texture map associations will have been re-arranged, and when the frame rendered, the water region will be distorted in a way that simulates the aforementioned water effects.

5.0 Alternate Embodiments

While the invention has been described in detail by specific reference to preferred embodiments thereof, it is understood that variations and modifications thereof may be made without departing from the true spirit and scope of the invention. For example, the region of water being added could be smaller than the scene depicted in the input image and replace part of the scene. In this case, only a portion of the scene depicted in the input image is used to create the reflection image—namely that portion which would normally be reflected in a body of water having the size and location of the water added to the image. The input image and reflected image are then merged using conventional methods, with the reflection image being superimposed over the input image in the desired location. As the resulting composite image is the same size as the input image, resizing would not be needed, unless a different frame size is desired. The remaining processes describe previously would apply, with the caveat that the height map would cover only that portion of the composite image representing the water region.

Wherefore, what is claimed is:

1. A computer-implemented process for generating a video having interactive water effects, comprising using a computer to perform the following process actions:
   inputting an image of a scene;
   generating a reflection copy of the scene depicted in the input image to create a water region image, wherein the water region image comprises the reflection copy of the entire scene;
   merging the input image and water region image, and sizing the merged image to fit a desired frame size, to produce a first frame of the video;
   distorting the water region portion of the merged image to simulate at least one ripple originating at a site selected by a viewer; and
   generating a sequence of additional frames, each of which comprises a distorted version of the water region of the immediately preceding frame in which any ripple simulated in the immediately preceding frame is shown in a new location that simulates the natural motion of a ripple across a surface of a body of water displaying the frames.

2. The process of claim 1, wherein the process action of merging the input image and the water region image comprises the actions of:
   disposing the input image in the upper portion of the merged image; and
   disposing the water region image in the lower portion of the merged image with an upper edge thereof placed adjacent to a lower edge of the input image such that the water region image is oriented so as to appear as an upside down copy of the input image.

3. The process of claim 2, wherein the process action of creating the water region image comprises an action of applying a reflection attenuation factor to the reflection copy of the input image which has the effect of obscuring the depicted scene.

4. The process of claim 3, wherein the process action of applying the reflection attenuation factor comprises an action of scaling down the intensity of each pixel in the water region image by an amount specified by the factor.

5. The process of claim 3, wherein the degree to which the depicted scene is obscured by application of the reflection attenuation factor is selected by a user generating the interactive water effects video.

6. The process of claim 1, wherein the process action of distorting the water region portion of the merged image to simulate at least one ripple originating at a site selected by a viewer, comprises the actions of:
   establishing a height map comprising a plurality of points each of which is assigned a height value and each of which corresponds to a different location of the water region portion of the merged image;
   displaying the merged image to the viewer and inputting the location of each site selected by the viewer in the water region of the merged image;
   imposing a ripple mask onto the height map established for the merged image by modifying the assigned height values of the points thereof corresponding to each viewer-selected location of the merged image, as well as height map points corresponding to locations of the merged image adjoining the viewer-selected locations;
   computing new image coordinates for each location in the water region of the merged image that correspond to a height map point using the height map values associated with each of said locations; and moving a pixel or pixels associated with each of said locations to the new image coordinates.

7. The process of claim 6, wherein the process action of establishing a height map, comprises an action of establishing a separate height map point for each pixel of the water region portion of the merged image.

8. The process of claim 1, wherein the process action of generating a sequence of additional frames, comprises, for each new frame, the actions of:

computing a new height map for the frame being generated from the height map associated with the immediately preceding frame;

computing new image coordinates for each location in the water region of the frame being generated that correspond to a height map point using the new height map values associated with each of said locations; and moving a pixel or pixels associated with each of said locations to the new image coordinates.

9. A system for generating a video having interactive water effects, comprising:

a general purpose computing device;

a computer program comprising program modules executable by the computing device, wherein the computing device is directed by the program modules of the computer program to, input an image of a scene;

generate a reflection copy of the scene depicted in the input image to create a water region image, wherein the water region image comprises the reflection copy of the entire scene;

merge the input image and water region image, and sizing the merged image to fit a desired frame size, to produce a first frame of the video;

distort the water region portion of the merged image to simulate at least one ripple originating at a site selected by a viewer;

further distort the water region portion of the merged image to simulate a periodic wave; and generate a sequence of additional images, each of which comprises a distorted version of the water region of the immediately preceding frame in which each ripple and the periodic wave simulated in the immediately preceding frame is shown in a new location that simulates the natural motion of a ripple and wave across a surface of a body of water.

10. The system of claim 9, wherein the program module for distorting the water region portion of the merged image to simulate a periodic wave, comprises sub-modules for:

establishing a height map comprising a plurality of points each of which is assigned a height value and each of which corresponds to a different location of the water region portion of the merged image;

generating periodic wave height values for each height map point which simulate the shape and location of a wave on the surface of a body of water at a given point in time;

computing new image coordinates for each location in the water region of the merged image that correspond to a height map point using the height map values and periodic wave height values associated with each of said locations; and moving a pixel or pixels associated with each of said locations to the new image coordinates.

11. The system of claim 10, wherein the sub-module for generating periodic wave height values for each height map point at a given point in time, comprises a sub-module for generating a one-dimensional wave which simulates propagation only in the vertical direction from the top of the water region toward the bottom of the water region.

12. The system of claim 9, wherein the program module for generating a sequence of additional frames, comprises, for each new frame, sub-modules for:

computing a new height map for the frame being generated from the height map associated with the immediately preceding frame;

computing new image coordinates for each location in the water region of the frame being generated that correspond to a height map point using the new height map values associated with each of said locations; and moving a pixel or pixels associated with each of said locations to the new image coordinates.

13. A computer-implemented process for generating a video depicting water effects, comprising using a computer to perform the following process actions:

defining a orthogonal grid comprising a plurality of vertex points, said grid being sized to match a desired size of a water region in an overall scene depicted in each frame of the video;

inputting a texture map that is used in conjunction with a model of a scene to generate an image of the scene;

generating a reflection copy of the texture map and sizing it to match the overall size of the grid to create a water region texture map, wherein the water region texture map comprises the reflection copy of the entire scene;

merging the input texture map and water region texture map to create a combined texture map, wherein the input texture map is sized to fit and associated with an upper portion of the video frames and the water region texture map is associated with a lower portion of the video frames, and wherein the water region texture map is inverted so that the water region of the video frames will appear to be an upside down image of the upper portion of the frames when rendered;

superimposing the grid on the water region texture map and associating each point of the grid with the closest water region texture map coordinate; and rendering a sequence of video frames using a combined texture map, wherein each frame is rendered using a separate combined texture map whose associated grid's vertices, except for the first frame in the sequence, have been assigned height values which are at least initially derived from the immediately preceding frame in the sequence, and wherein the water region portion of the combined texture map associated with each frame in which water effects are to be depicted is distorted to simulate movement of the surface of the water in the water region of that frame using the height values assigned to its grid displaying the frames.

14. The process of claim 13, wherein the process action of defining a orthogonal grid, comprises the actions of:

establishing the coordinates of the four corner vertices of the video frames;

specifying a height of a horizontal line which divides said upper and lower portions of the video frames;

specifying the number of equally-spaced horizontal grid lines and the number of equally-spaced vertical grid lines to be employed in the grid; and identifying the grid coordinates of each vertex of the grid given the specified number of horizontal and vertical grid lines.

15. The process of claim 13, wherein the unit height of the height values assigned to a vertex of the grid associated with a combined texture map is scaled so that all height values are integer numbers.

16. The process of claim 15, wherein the process action of rendering a sequence of video frames using a combined texture map, wherein each frame is rendered using a separate combined texture map whose associated grid's vertices, except for the first frame in the sequence, have been assigned height values which are at least initially derived from the immediately preceding frame in the sequence, comprises the actions of:

for each frame to be rendered, initially assigning height values to each vertex of the grid associated with the combined texture map for the frame under consideration by, using integer computation, summing the height values assigned to vertices in the grid associated with the immediately preceding frame's combined texture map which are directly above and below, and directly to the left and to the right, of the location of the vertex under consideration, wherein for the first frame in the sequence it is assumed all the height values associated with the immediately preceding frame are equal to zero, dividing the height value sum by two to compute a height value quotient, subtracting the height value assigned to the vertex location under consideration in the grid associated with the texture map of the immediately preceding frame from the computed height value quotient to computed a height value for the vertex under consideration; and assigning the computed height value to the grid vertex under consideration.

17. The process of claim 16, wherein the process action of initially assigning height values to each vertex of the grid associated with the combined texture map for each frame to be rendered subsequent to the first frame, further comprises, prior to assigning the new height value to each grid vertex under consideration, an action of applying a damping factor to the computed height value to produce a damped height value, wherein the application of the damping factor reduces the computed height value to simulate a smoothing out of the ripple or ripples over time, and assigning the damped height value as the computed height value to the grid vertex under consideration.

18. The process of claim 16, wherein the process action of rendering frames having a water region portion of the combined texture map associated therewith which is distorted, comprises an action of distorting the water region portion of the combined texture map to simulate at least one ripple originating at a site selected by a viewer.

19. The process of claim 16, wherein the process action of rendering frames having a water region portion of the combined texture map associated therewith which is distorted, comprises an action of distorting the water region portion of the combined texture map to simulate a periodic wave.

* * * * *